(12) United States Patent
Blum

(10) Patent No.: US 9,898,694 B2
(45) Date of Patent: *Feb. 20, 2018

(54) TRI-LAYER TRANSACTION CARDS AND ASSOCIATED METHODS

(71) Applicant: Black Card LLC, Jackson, WY (US)

(72) Inventor: Scott Alan Blum, Jackson, WY (US)

(73) Assignee: Black Card LLC, Jackson, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,706

(22) Filed: Feb. 24, 2016

(65) Prior Publication Data

US 2016/0171356 A1 Jun. 16, 2016

Related U.S. Application Data

(63) Continuation-in-part of application No. 13/830,604, filed on Mar. 14, 2013.

(60) Provisional application No. 61/653,260, filed on May 30, 2012.

(51) Int. Cl.
G06K 19/02 (2006.01)
G06K 19/077 (2006.01)
B42D 25/45 (2014.01)
B42D 25/47 (2014.01)

(52) U.S. Cl.
CPC ............ *G06K 19/02* (2013.01); *B42D 25/45* (2014.10); *B42D 25/47* (2014.10); *G06K 19/022* (2013.01); *G06K 19/07722* (2013.01)

(58) Field of Classification Search
CPC ...... B42D 25/47; B42D 25/45; B42D 25/455; B42D 25/46; B42D 25/00; B42D 25/20; B42D 25/22; B42D 25/285; B42D 2033/00; G06K 19/02; G06K 19/022; G06K 19/07722
USPC ......................................... 235/492, 487, 488
See application file for complete search history.

(56) References Cited

U.S. PATENT DOCUMENTS

| 4,547,002 A | 10/1985 | Colgate, Jr. |
| 5,578,415 A | 11/1996 | Hayashi et al. |
| 5,856,662 A | 1/1999 | Kohama et al. |
| 5,879,775 A | 3/1999 | Walter et al. |
| 6,025,283 A * | 2/2000 | Roberts ................... B32B 15/06 257/679 |
| D438,563 S | 3/2001 | Webb et al. |
| 6,561,657 B1 | 5/2003 | Schofield |
| D505,450 S | 5/2005 | Lauer et al. |

(Continued)

FOREIGN PATENT DOCUMENTS

| CN | 1177409 | 3/1998 |
| CN | 101808831 | 8/2010 |

(Continued)

OTHER PUBLICATIONS

International Search Report from Korean Intellectual Property Office dated Feb. 7, 2014 for relating International Application No. PCT/US2013/067335.

(Continued)

*Primary Examiner* — Suezu Ellis
(74) *Attorney, Agent, or Firm* — Klein, O'Neill & Singh, LLP

(57) ABSTRACT

A transaction card having three layers, wherein the first layer is metal, the second layer is a polymer, and the third layer is a carbon-containing layer.

20 Claims, 7 Drawing Sheets

(56) References Cited

U.S. PATENT DOCUMENTS

| | | | |
|---|---|---|---|
| D561,628 S | 2/2008 | Cherneff et al. | |
| D574,281 S | 8/2008 | Cherneff et al. | |
| D632,735 S | 2/2011 | McGrane et al. | |
| D642,614 S | 8/2011 | Ahmad et al. | |
| D647,097 S | 10/2011 | Tung et al. | |
| D650,438 S | 12/2011 | Albrecht et al. | |
| D656,542 S | 3/2012 | Ahmad et al. | |
| D665,851 S | 8/2012 | Davis | |
| D680,168 S | 4/2013 | Ahmad et al. | |
| D680,169 S | 4/2013 | Ahmad et al. | |
| D693,998 S | 4/2013 | Villanova | |
| 8,434,675 B2 | 5/2013 | Faith | |
| 8,485,447 B1 | 7/2013 | Pyhrr et al. | |
| 8,640,948 B2 | 2/2014 | Blum | |
| 8,672,232 B2 | 3/2014 | Herslow | |
| 8,725,589 B1 | 5/2014 | Skelding et al. | |
| 8,807,437 B2 | 8/2014 | Reed et al. | |
| 9,070,053 B2* | 6/2015 | Mosteller | G06K 19/02 |
| 9,390,363 B1* | 7/2016 | Herslow | B29C 59/026 |
| 9,440,481 B1* | 9/2016 | Thomson | B42D 25/20 |
| 9,466,019 B2* | 10/2016 | Blum | G06K 19/07722 |
| 2002/0066790 A1 | 6/2002 | Cocco | |
| 2003/0226899 A1 | 12/2003 | Finkelstein | |
| 2004/0217178 A1 | 11/2004 | Lasch et al. | |
| 2004/0224590 A1 | 11/2004 | Rawa et al. | |
| 2005/0023359 A1 | 2/2005 | Saunders | |
| 2005/0168339 A1 | 8/2005 | Arai et al. | |
| 2005/0259326 A1* | 11/2005 | Weber | B32B 7/12 359/589 |
| 2006/0102729 A1* | 5/2006 | Gandel | G06K 19/02 235/487 |
| 2006/0121502 A1 | 6/2006 | Cain et al. | |
| 2007/0026205 A1 | 2/2007 | Anton et al. | |
| 2008/0245865 A1 | 10/2008 | Mosteller | |
| 2009/0078776 A1* | 3/2009 | Blum | G06K 19/02 235/487 |
| 2009/0115185 A1 | 5/2009 | Hoffmuller et al. | |
| 2009/0294543 A1* | 12/2009 | Varga | G06K 19/02 235/492 |
| 2010/0291354 A1* | 11/2010 | Kawakami | B32B 27/00 428/195.1 |
| 2012/0325914 A1* | 12/2012 | Herslow | B32B 37/02 235/488 |
| 2013/0168454 A1 | 7/2013 | Oh et al. | |
| 2013/0206320 A1 | 8/2013 | Mungas et al. | |
| 2013/0320095 A1 | 12/2013 | Blum | |
| 2014/0021261 A1 | 1/2014 | Mosteller | |
| 2014/0070009 A1* | 3/2014 | Zambrano L. | G06K 19/02 235/488 |
| 2014/0158773 A1 | 6/2014 | Blum | |
| 2014/0174645 A1 | 6/2014 | Segura et al. | |
| 2015/0339564 A1* | 11/2015 | Herslow | B32B 33/00 235/488 |

FOREIGN PATENT DOCUMENTS

| | | |
|---|---|---|
| CN | 102089772 | 6/2011 |
| CN | 202196435 | 4/2012 |
| CN | 302579200 S | 9/2013 |
| CN | 103854050 | 6/2014 |
| EP | 0330726 | 2/1995 |
| HK | 1300776.0M002 | 5/2013 |
| JP | S61-12167 | 1/1986 |
| JP | 61-162386 | 7/1986 |
| JP | H2-41976 | 3/1990 |
| JP | H0648075 | 2/1994 |
| JP | H07285197 | 10/1995 |
| JP | 2006512686 | 4/2006 |
| JP | 2007069493 | 3/2007 |
| JP | 2010540287 | 12/2010 |
| JP | 2011521377 | 7/2011 |
| WO | WO2009/042786 | 4/2009 |
| WO | WO2014/088729 | 6/2014 |

OTHER PUBLICATIONS

Written Opinion of the International Searching Authority from Korean Intellectual Property Office dated Feb. 7, 2014 for relating International Application No. PCT/US2013/067335.
Office Action from USPTO dated Apr. 21, 2014 for U.S. Appl. No. 13/830,636.
Office Action from USPTO dated May 22, 2014 for U.S. Appl. No. 13/830,604.
Final Office Action from USPTO dated Nov. 6, 2014 for U.S. Appl. No. 13/830,636.
Final Office Action from USPTO dated Nov. 19, 2014 for U.S. Appl. No. 13/830,604.
Office Action from USPTO dated Feb. 18, 2015 for U.S. Appl. No. 13/830,636.
Office Action from USPTO dated Feb. 20, 2015 for U.S. Appl. No. 29/439,117.
Office Action from USPTO dated Feb. 27, 2015 for U.S. Appl. No. 13/830,604.
Final Office Action from USPTO dated Jun. 5, 2015 for U.S. Appl. No. 13/830,636.
International Preliminary Report on Patentability from WIPO dated Jun. 9, 2015 for relating International Application No. PCT/US2013/067335.
Office Action from USPTO dated Jun. 25, 2015 for U.S. Appl. No. 29/439,117.
Final Office Action from USPTO dated Aug. 27, 2015 for U.S. Appl. No. 13/830,604.
Office Action from USPTO dated Oct. 1, 2015 for U.S. Appl. No. 13/830,636.
Office Action from USPTO dated Apr. 7, 2016 for related U.S. Appl. No. 13/830,604.
Final Office Action from USPTO dated Apr. 22, 2016 for related U.S. Appl. No. 13/830,636.
Final Office Action from USPTO dated Jun. 3, 2016 for related U.S. Appl. No. 29/439,117.
Extended European Search Report from European Patent Office dated Jul. 5, 2016 for related European Application No. EP13860285.9.
Office Action from State Intellectual Property Office of People's Republic of China dated Mar. 3, 2017 for related Chinese Application No. 201310173318.5.
Office Action from USPTO dated Sep. 9, 2016 for related U.S. Appl. No. 13/830,636.
Final Office Action from USPTO dated Nov. 17, 2016 for related U.S. Appl. No. 13/830,604.
Notice of Allowance from USPTO dated Mar. 8, 2017 for related U.S. Appl. No. 13/830,604.
Office Action from Japanese Patent Office dated Mar. 21, 2017 for related Japanese Application No. 2013-084118.
Final Office Action from USPTO dated May 12, 2017 for related U.S. Appl. No. 13/830,636.
Office Action from State Intellectual Property Office of P.R.C. dated Aug. 2, 2017 for related Chinese Application No. 201310176333.5.
Decision of Refusal from Japanese Patent Office dated Sep. 5, 2017 for related Japanese Application No. 2013-110173.
Office Action from State Intellectual Property Office of P.R.C. dated Oct. 25, 2017 for related Chinese Application No. 201310173318.5.
Notice of Allowance from Japanese Patent Office dated Nov. 14, 2017 for related Japanese Application No. 2013-084118.

\* cited by examiner

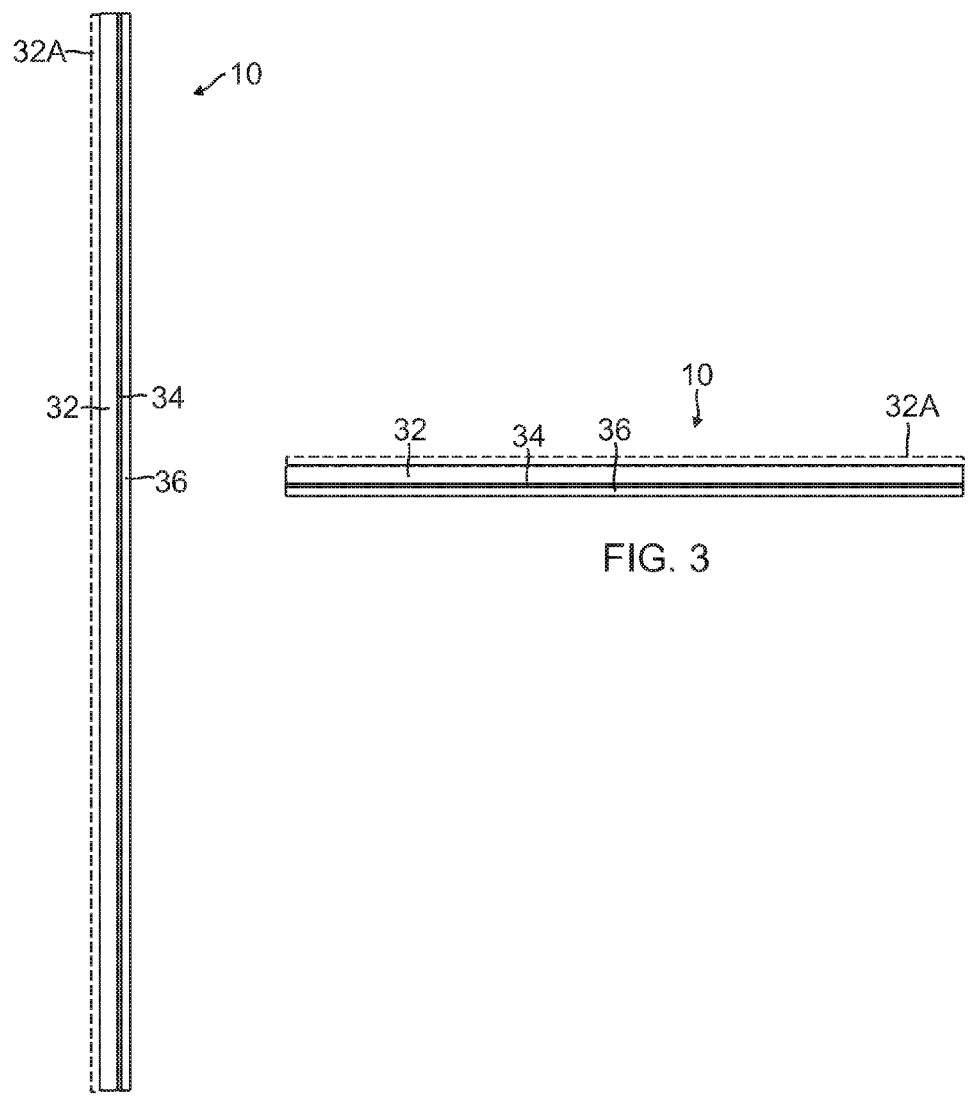

ns and associated methods

CROSS-REFERENCE TO RELATED APPLICATION

This application is a continuation-in-part of patent application Ser. No. 13/830,604, filed on Mar. 14, 2013, which claims priority to provisional application Ser. No. 61/653,260, filed on May 30, 2012, the entire contents of both applications are hereby incorporated by reference.

BACKGROUND

Technical Field

The present disclosure relates to transaction cards, such as, for example, credit cards and debit cards that are used as substitutes for cash.

Related Art

The vast majority of transaction cards in use today are constructed of plastic. These cards tend to be flimsy and wear out or break easily. Continuous efforts are being made to improve transaction cards.

SUMMARY

The various aspects of the present transaction card have several features, no single one of which is solely responsible for their desirable attributes. Without limiting the scope of the present aspects as expressed by the claims that follow, their more prominent features will now be discussed briefly. After considering this discussion, and particularly after reading the section entitled "Detailed Description," one will understand how the features of the present embodiments provide advantages, which include increased strength and durability, greater rigidity, decreased weight, longer lifespan, enhanced feel and high tech look.

One aspect of the present transaction card comprises a substantially planar sheet having a front surface, a back surface and a continuous peripheral edge. In an aspect, the planar sheet includes a first layer, a second layer, and a third layer, wherein the first layer is metal, the second layer is a plastic, and the third layer is a carbon compound.

BRIEF DESCRIPTION OF THE DRAWINGS

The preferred aspects of the present transaction card will now be discussed in detail with an emphasis on highlighting the advantageous features. These aspects depict the novel and non-obvious transaction card shown in the accompanying drawings, which are for illustrative purposes only. These drawings include the following figures, in which like numerals indicate like parts:

FIG. 3 is a bottom plan view of the transaction card of FIG. 1, the top plan view being a mirror image thereof;

FIG. 4 is a left-side elevation view of the transaction card of FIG. 1, the right-side elevation view being a mirror image thereof;

DETAILED DESCRIPTION

Figure 1:
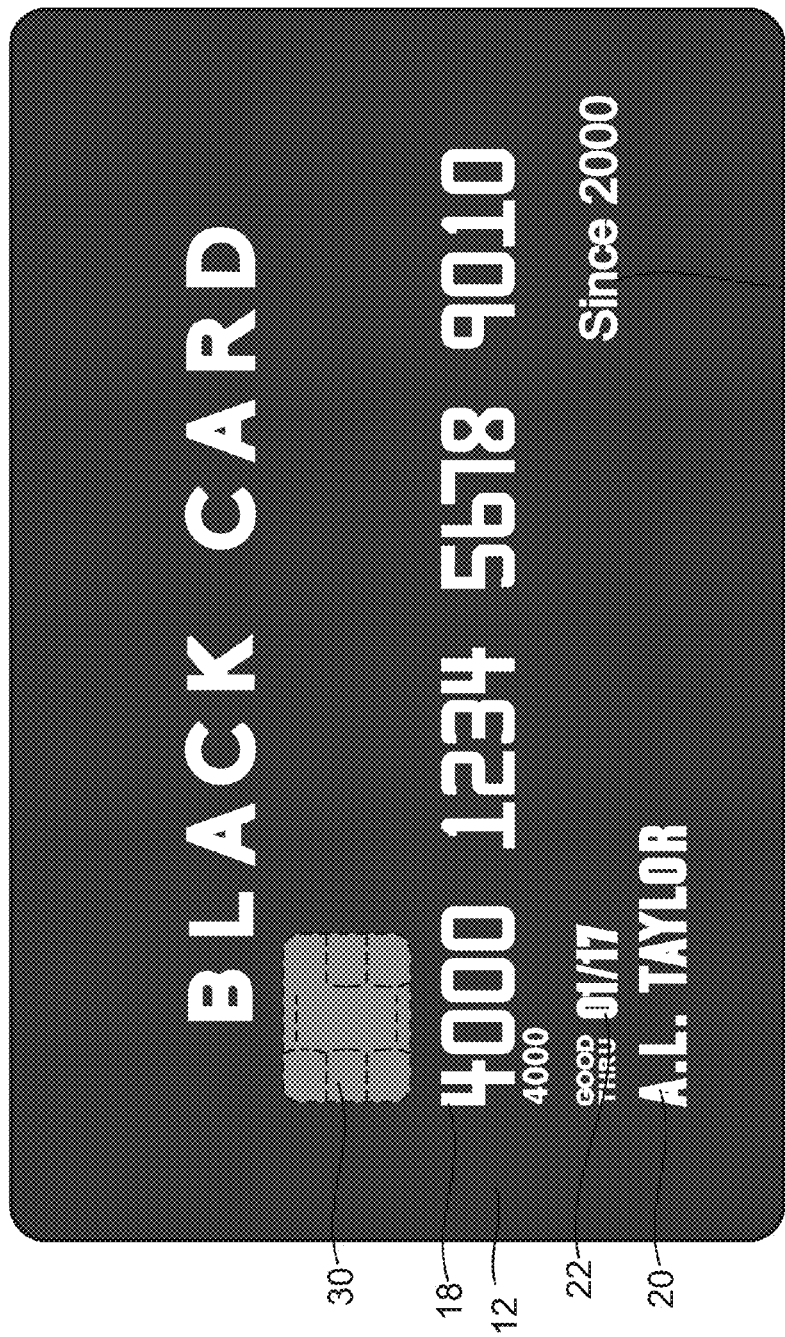
FIG. 1 is a front elevation view of an aspect of the transaction card according to the present disclosure.
Figure 2:
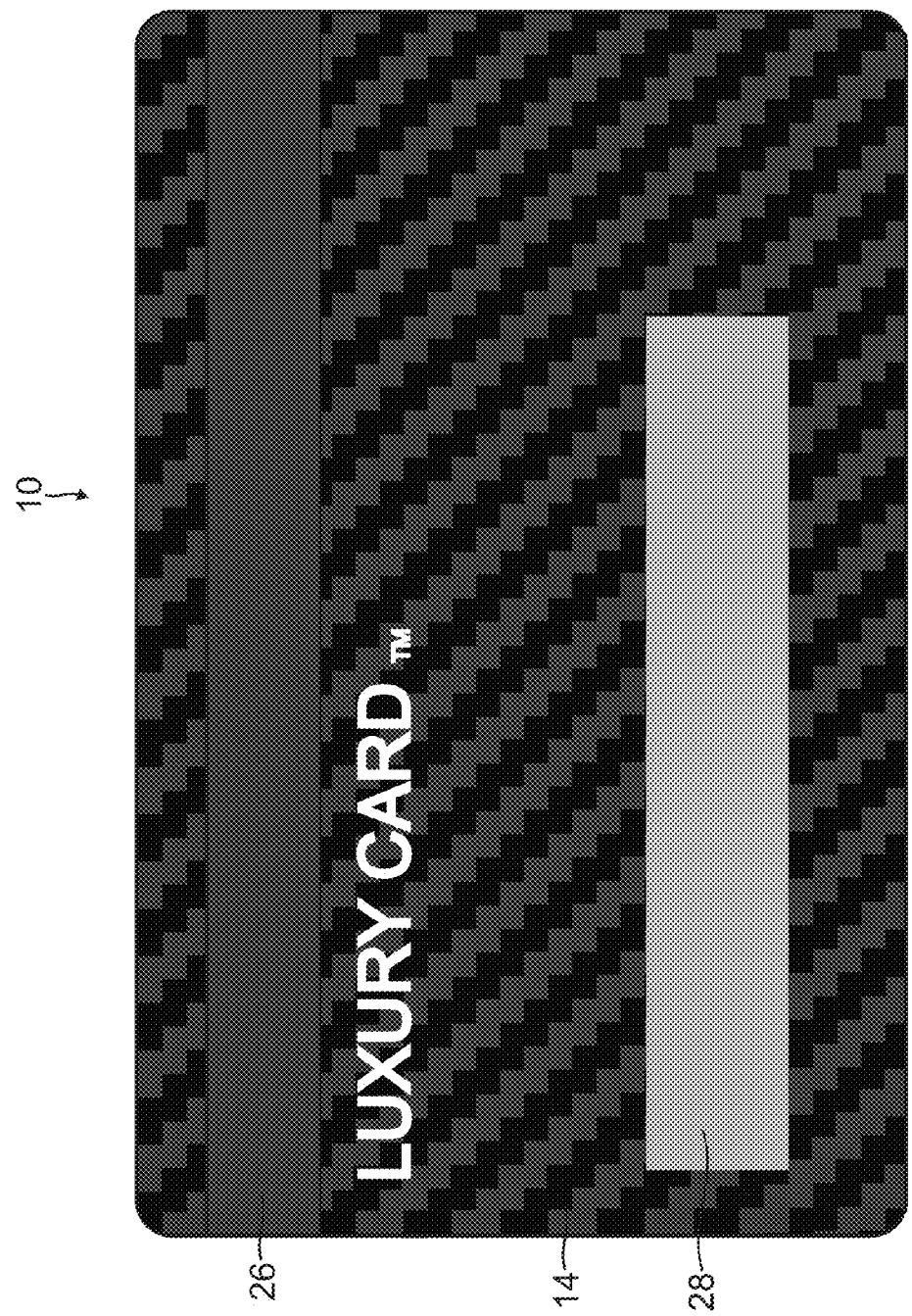
FIG. 2 is a rear elevation view of the transaction card of FIG. 1.
Figure 5:
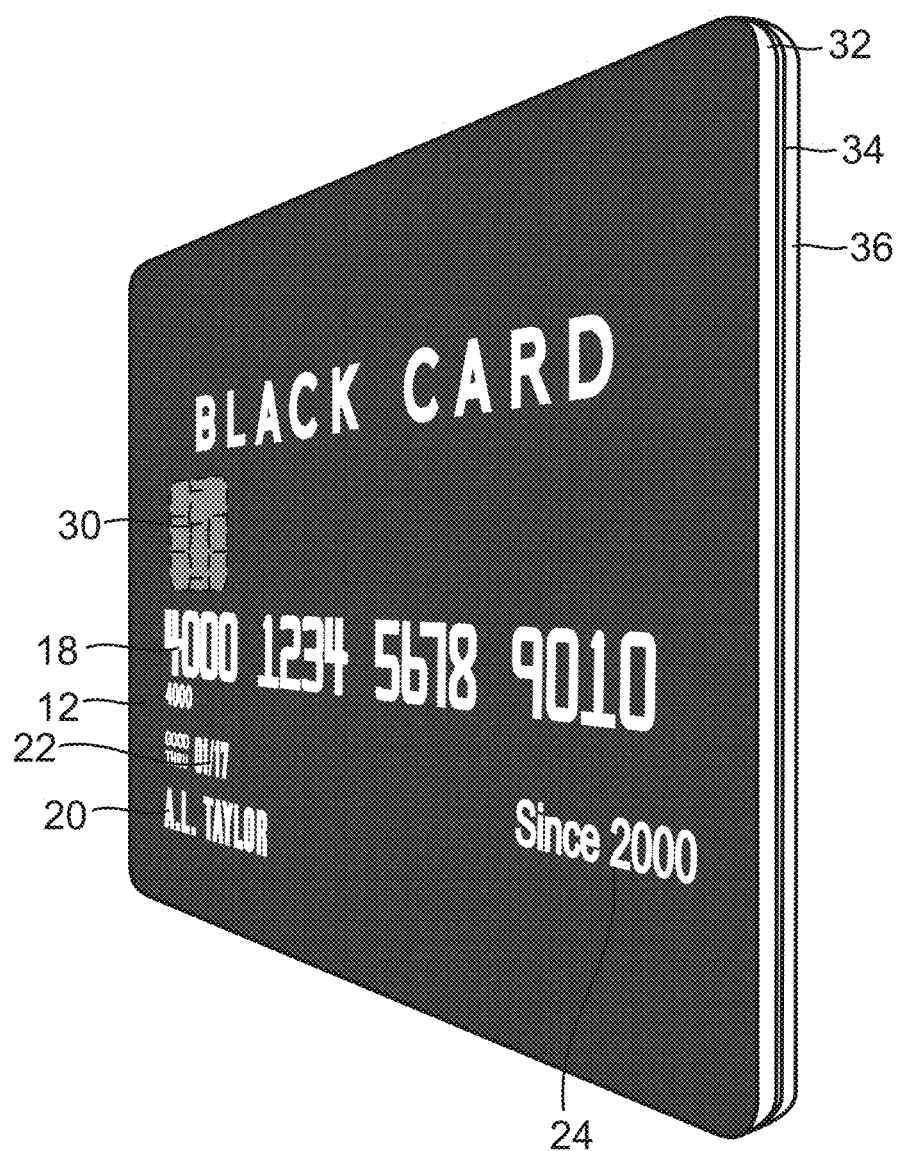
FIG. 5 is a front perspective view of the transaction card of FIG. 1, also showing the side of the card.
Figure 6:
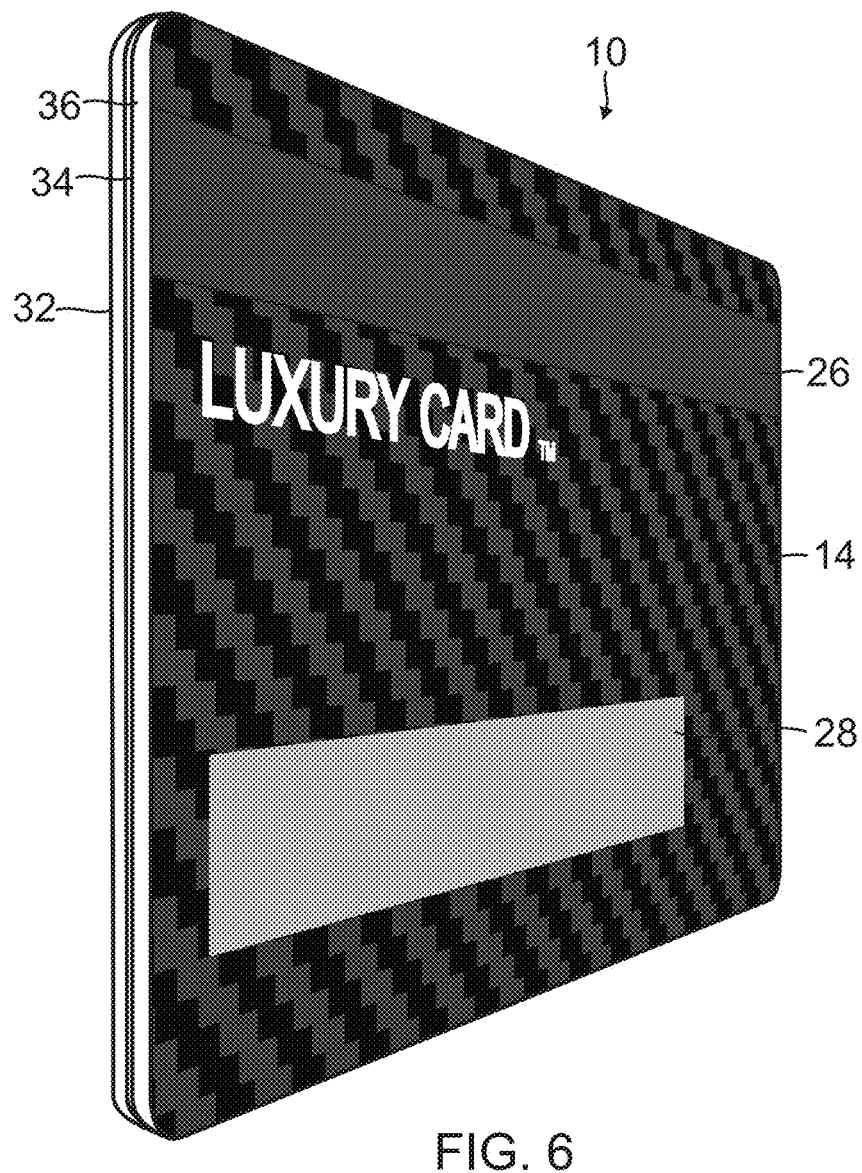
FIG. 6 is a rear perspective view of the transaction card of FIG. 1, also showing the side of the card.
Figure 7:
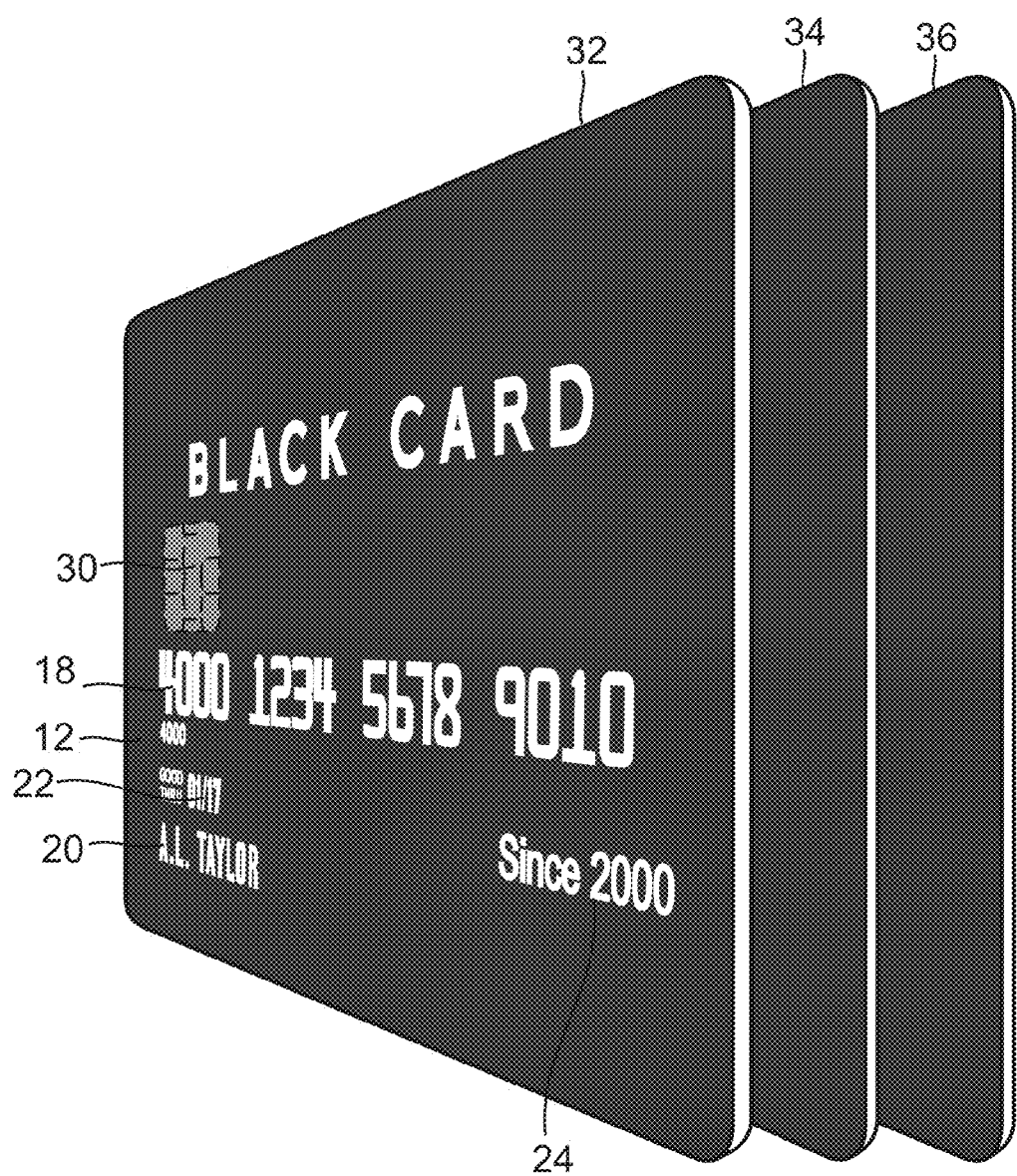
FIG. 7 is an exploded perspective view of the transaction card of FIG. 1.

With reference to FIGS. 1 and 2, the present transaction card 10 is a substantially planar sheet having a front surface 12 and a back surface 14. The card 10 includes a continuous peripheral edge 16, which in the illustrated aspect is substantially rectangular. However, those of ordinary skill in the art will appreciate that the card 10 could have virtually any shape, such as square, round or hexagonal. The scope of the present card 10 is not limited to any particular shape.

In the illustrated aspect, the transaction card 10 bears a number 18 (FIG. 1) that identifies the card 10 as being associated with a particular account. In the illustrated aspect, the account number 18 has sixteen digits. However, in alternative aspects the card 10 may have fewer or more digits. The card 10 also bears the name 20 of the cardholder and an expiration date 22. In certain aspects, the card 10 may also bear a year or date on which the cardholder first acquired the card 10 (shown as date 24). The information displayed on the card 10 may be applied in any suitable manner, such as embossing, printing, engraving, etching, combinations of the same, etc. In an aspect, the information displayed on the card is laser etched. In some aspects, some of the information 18, 20, 22, 24 may be omitted.

With reference to FIG. 2, the back surface 14 of the present transaction card 10 includes a magnetic strip 26. The magnetic strip 26 stores information that is readable by a magnetic reader. For example, the magnetic strip 26 may contain a series of digits from which the magnetic card reader can obtain information about the account associated with the card 10 and/or the cardholder. The back surface 14 of the present transaction card 10 further includes a signature panel 28.

The present transaction card 10 further includes an embedded chip 30 (FIG. 1), such as a radio-frequency identification (RFID) chip or an EMV (Europay, MasterCard and VISA) chip 30. RFID is a wireless non-contact system that uses radio-frequency electromagnetic fields to transfer data from the chip 30 to a receiver for the purposes of automatic identification and tracking. EMV is a global standard for inter-operation of integrated circuit cards (IC cards or "chip cards") and IC card capable point of sale (POS) terminals and automated teller machines (ATMs), for authenticating credit and debit card transactions. While not shown, the card 10 may further include a holographic image, which is useful to discourage counterfeiting. While also not shown, the card 10 may further include one or more transparent portions. Such transparent portions may include one or more optically recognizable layers or infrared-blocking ink to allow the transparent portion(s) to be recognized by an optical card reader. These additional features may allow the transaction card 10 to function more easily, efficiently, and/or more securely.

With reference to FIGS. 3 through 7, the transaction card 10 is constructed of a front layer 32, middle layer 34, and a back layer 36. In the illustrated aspect, the front layer 32 is a metal and the middle layer 34 is a polymer. A non-exhaustive and non-limiting list of example metals and metal alloys for the front layer 32 includes scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, aluminum, gallium, indium, thallium, lead, bismuth, tin, stainless steel, bronze, brass, nickel-silver, and any combination(s) of the foregoing. In an aspect, the metal layer 32 comprises of stainless steel.

A non-exhaustive and non-limiting list of example polymers for the middle layer includes polyethylene, polyethylene terephthalate, polypropylene, polystyrene, polytetrafluoroethylene, polyvinylchloride (PVC), polychlorotrifluoroethylene, polyacrylonitrile, polychloroprene, polyurethane, polyamide (nylon), and polyacrylamide. The front and middle layers 32, 34 may, for example, be adhered to one another with an adhesive or secured in any other manner.

In an aspect, the back layer 36 includes a carbon-containing compound. For example, the back layer 36 may be in any of a variety of forms including materials such as carbon graphite and/or carbon fiber. In carbon fiber aspects, the back layer 36 may comprise a woven carbon fabric. In certain aspects, the back layer 36 may be entirely carbon. The percentage of carbon and/or carbon graphite in the back layer 36 may vary and may be up to 100%. However, the adaptive aspects are not limited to any particular ratio or percentage of carbon/carbon graphite or the type and form of carbon. In another aspect, the back layer 36 may be polycarbon that includes carbon and plastic. As illustrated in FIG. 2, the back layer 36 may include a magnetic strip 26 and a signature panel 28 set into or on the back layer 36, which may be attached via an adhesive or other suitable attachment mechanism. In an aspect, back layer 36 may further include a laminate overlying the magnetic strip 26 and signature panel 28 to help ensure the integrity of the card and its components and extend the life of the card.

In the illustrated aspect, the front layer 32 may be about 0.022" thick, the middle layer 34 may be about 0.005" thick, and the back layer 36 may be about 0.005" thick, for an overall thickness of approximately 0.032" for the card 10. In other aspects, the front layer 32 may be between about 0.020" and about 0.024" thick, the middle layer 34 may be between about 0.004" and about 0.006" thick, and/or the back layer 36 may be between about 0.004" and about 0.006" thick. In still other embodiments, an overall thickness of card 10 may be in the range of 0.0315"-0.034" with one or more of the layers falling outside the identified thickness ranges. Additionally, in an aspect, the front layer 32 is thicker than the thickness of the embedded chip 30 so that milling out (or otherwise creating) a hole for the chip placement does not create a hole entirely through the front layer 32. In another aspect, however, the chip may be embedded in both the front layer 32 and the middle layer 34. However, the foregoing dimensions are not limiting, as the card 10 and/or its layers 32, 34, 36 could have any thickness.

In some aspects, the front layer 32 may include a coating, such as a physical vapor deposition (PVD) coating. The PVD coating may be, for example, black in color. In other aspects, the PVD coating may comprise any of a number of other colors, patterns, images, or the like. As an example, the PVD coating may be carbon or Titanium Nitride. In yet another aspect, instead of the PVD coating, the front layer 32 is gold plated (e.g. 32A (FIGS. 3 and 4), for example, with 14-carat, 24-carat gold or any other purity level.

In another aspect, the transaction card 10 may have the front layer 32 with a PVD coating of carbon and titanium nitride or gold plated The back layer 36 may be carbon based, polymer based or a combination thereof. In this one example, middle layer 34 may not be used.

The vast majority of today's transaction cards are constructed of plastic. The present transaction card 10 is advantageously stronger and more durable than such plastic cards. It is also more rigid, lighter, and has a longer lifespan. In addition to these benefits, the metal and carbon outer layer combination provides the card 10 with a unique feel and high tech look. The card 10 is thus more desirable for its distinctiveness over a typical plastic card. At the same time, the middle layer 34 provides lightness over all metal cards. The middle layer 34 also can be a relatively pliant material that can be more easily etched out to accommodate the embedded chip 30 without compromising the integrity of the back layer (or carbon layer) 36.

A process of making the present card 10 may comprise printing a back surface of a planar carbon sheet with text, as shown at block B802. The text may include the text shown in FIG. 2, and/or an Internet address with information relating to the card 10, and/or one or more customer service phone numbers, and/or other text. The printing may be carried out on a sheet of the back layer 36 that will eventually be cut in a general grid pattern to separate a plurality of cards 10 from one another.

The process further comprises coating a sheet of metal with a coating using a PVD process, as shown at block B804. Again, the coating may be carried out on a sheet of the front layer 32 that will eventually be cut in a general grid pattern to separate a plurality of cards 10 from one another. In alternative aspects, the coating process may be a process other than PVD, such as diamond-like carbon (DLC) application process. Further, in alternative aspects the coating may comprise multiple colors, patterns, images, or the like.

The process further comprises adhering the front layer sheet to a middle sheet, such as a polymer sheet, as shown at block B806. At block B808, the back layer sheet may be adhered to the opposite side of the polymer sheet. In other aspects, the middle sheet may be heated and bonded to one or both of the front and back layer without adhesive. The front surface 12 of the card 10 may then be etched to create additional text and/or an ornamental design, as shown at block B810. In alternative aspects, the additional text and/or an ornamental design may be applied with a process other than etching, such as engraving.

The process further comprises hot stamping the signature panel, magnetic strip, and hologram onto the back surface of the card 10, and attaching the RFID or other embedded chip 30, as shown at blocks B812 and B814, respectively. In an aspect, attaching the embedded chip 30 may comprise milling a recess into the front layer 32 of the card 10. In another aspect, the recess may be created during the etching step at block B810. The sheets are then cut to produce a plurality of cards 10, as shown at block B816. In one aspect, the metal and polymer sheets may measure 19.875"×25.20", and when cut each card 10 measures 3.370"×2.125". Each card 10 is then finalized with the card member information on the front surface 10, embossed with the last four digits of the account number and the card security code on the signature panel, and the magnetic strip and RFID chip are processed, as shown at block B818. In an aspect, the outer edge of each card 10 may be sanded or otherwise smoothed out to reduce the likelihood of rough edges. In an aspect, the edges may be laminated or otherwise finished. In yet another aspect, the completed edges of the card show the three distinct layers of the card, providing a novel appearance.

Figure 8:
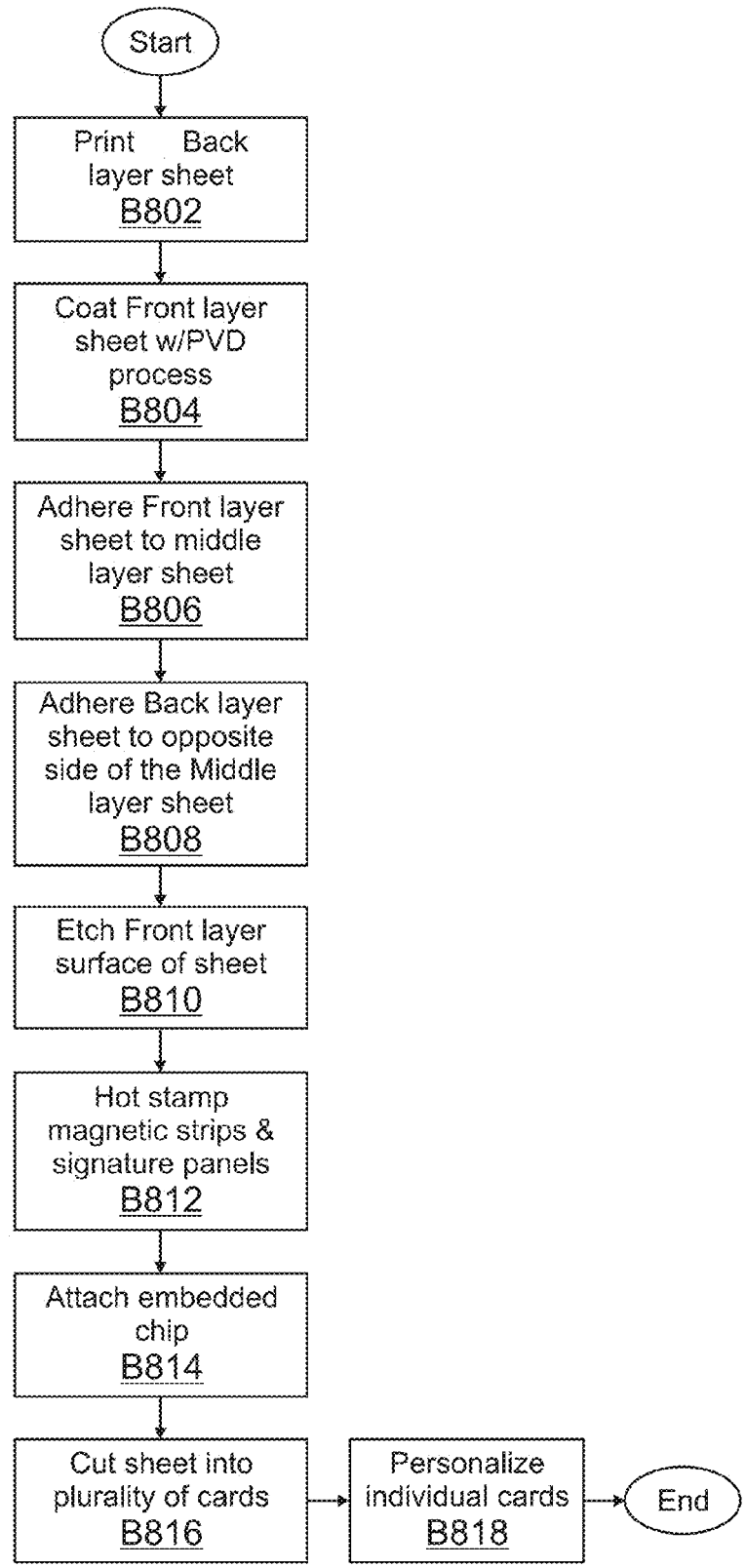
FIG. 8 illustrates a flow chart for an example process of producing transaction cards according the present disclosure.

The above description presents the best mode contemplated for carrying out the present transaction card, and of the manner and process of making and using it, in such full, clear, concise, and exact terms as to enable any person skilled in the art to which it pertains to make and use this transaction card. This transaction card is, however, susceptible to modifications and alternate constructions from that discussed above that are fully equivalent. For example, each of the front layer 32, middle layer 34, and back layer 36 may be the same or substantially the same color, or they may comprise different colors to show more clearly the layered make-up along the edges. Different layers may also incorporate different textures to provide a unique feel for a user. Furthermore, the steps described in FIG. 8 may be ordered differently, combined, and/or split into multiple steps without detracting from the teachings herein. Consequently, this transaction card is not limited to the particular embodiments disclosed. On the contrary, this transaction card covers all modifications and alternate constructions coming within the spirit and scope of the transaction card as generally expressed by the following claims, which particularly point out and distinctly claim the subject matter of the transaction card.

What is claimed is:

1. A transaction card, comprising:
a substantially planar sheet having a front surface, a back surface and a continuous peripheral edge;
wherein the planar sheet includes a first layer as a top layer laid entirely over a second layer that is a middle layer laid entirely over a third layer that is a bottom layer, wherein the first layer is gold plated stainless steel, the second layer is non-metallic and attached to the first layer without using an adhesive and, the third layer comprises a carbon compound; and wherein the first layer has a first thickness that is greater than a thickness of the second layer and a thickness of the third layer.

2. The transaction card of claim 1, wherein the second layer is a polymer.

3. The transaction card of claim 2, wherein the second layer comprises polyethylene, polyethylene terephthalate, polypropylene, polystyrene, polytetrafluoroethylene, polyvinylchloride (PVC), polychlorotrifluoroethylene, polyacrylonitrile, polychloroprene, polyamide (nylon), or polyacrylamide.

4. The transaction card of claim 1, wherein the third layer comprises at least one of carbon graphite and carbon fiber.

5. The transaction card of claim 1, wherein the third layer comprises a woven carbon fabric.

6. The transaction card of claim 1, wherein the second layer and the third layer, are bonded together using an adhesive.

7. The transaction card of claim 1, wherein the second layer is attached to the third layer without the use of an adhesive.

8. A transaction card, comprising:
a substantially planar sheet having a front surface, a back surface and a continuous peripheral edge;
wherein the planar sheet includes a first layer as a top layer laid entirely over a second layer that is a middle layer laid entirely over a third layer that is a bottom layer, wherein the first layer is gold plated stainless steel, the second layer is non-metallic and attached to the first layer without using an adhesive and, the third layer comprises a carbon compound; wherein the first layer has a first thickness that is greater than a thickness of the second layer and a thickness of the third layer; and wherein the first layer is gold plated with 14-carat gold.

9. The transaction card of claim 8, wherein the second layer is a polymer.

10. The transaction card of claim 9, wherein the second layer comprises polyethylene, polyethylene terephthalate, polypropylene, polystyrene, polytetrafluoroethylene, polyvinylchloride (PVC), polychlorotrifluoroethylene, polyacrylonitrile, polychloroprene, polyamide (nylon), or polyacrylamide.

11. The transaction card of claim 8, wherein the third layer comprises at least one of carbon graphite and carbon fiber.

12. The transaction card of claim 8, wherein the third layer comprises a woven carbon fabric.

13. The transaction card of claim 8, wherein the second layer and the third layer, are bonded together using an adhesive.

14. The transaction card of claim 8, wherein the second layer is attached to the third layer without the use of an adhesive.

15. A transaction card, comprising:
a substantially planar sheet having a front surface, a back surface and a continuous peripheral edge;
wherein the planar sheet includes a first layer as a top layer laid entirely over a second layer that is a middle layer laid entirely over a third layer that is a bottom layer, wherein the first layer is gold plated stainless steel, the second layer is non-metallic and attached to the first layer without using an adhesive and, the third layer comprises a carbon compound; wherein the first layer has a first thickness that is greater than a thickness of the second layer and a thickness of the third layer; and wherein the first layer is gold plated with 24-carat gold.

16. The transaction card of claim 15, wherein the second layer is a polymer.

17. The transaction card of claim 15, wherein the third layer comprises at least one of carbon graphite and carbon fiber.

18. The transaction card of claim 15, wherein the third layer comprises a woven carbon fabric.

19. The transaction card of claim 15, wherein the second layer and the third layer, are bonded together using an adhesive.

20. The transaction card of claim 15, wherein the second layer is attached to the third layer without the use of an adhesive.

* * * * *